(12) United States Patent
Sugitani

(10) Patent No.: US 7,122,927 B2
(45) Date of Patent: Oct. 17, 2006

(54) AUTOMOTIVE ALTERNATOR HAVING COOLING-AIR-INTAKE-WINDOW HAVING UNEVEN OPENING AREA ALONG ROTATIONAL DIRECTION

(75) Inventor: Katsuhiko Sugitani, Kariya (JP)

(73) Assignee: Denso Corporation, Kariya (JP)

( * ) Notice: Subject to any disclaimer, the term of this patent is extended or adjusted under 35 U.S.C. 154(b) by 93 days.

(21) Appl. No.: 10/242,407

(22) Filed: Sep. 13, 2002

(65) Prior Publication Data

US 2003/0094865 A1    May 22, 2003

(30) Foreign Application Priority Data

Nov. 6, 2001    (JP)    ............... 2001-340632

(51) Int. Cl.
*H02K 5/24* (2006.01)
*H02K 9/06* (2006.01)

(52) U.S. Cl. ............... 310/89; 310/59; 310/62; 310/51; 415/119

(58) Field of Classification Search ............... 310/62, 310/63, 51, 58, 59, 89
See application file for complete search history.

(56) References Cited

U.S. PATENT DOCUMENTS 4,492,885 A * 1/1985 Kitamura et al. ............... 310/62
4,684,835 A * 8/1987 Kline et al. ............... 310/59
5,194,770 A * 3/1993 Yoshioka et al. ............... 310/51
5,394,041 A * 2/1995 Oberdorfer-Bogel ............... 310/64
6,040,645 A * 3/2000 Lynch ............... 310/58
6,078,116 A    6/2000 Shiga et al.
6,417,585 B1 * 7/2002 Oohashi et al. ............... 310/58

FOREIGN PATENT DOCUMENTS

| DE | 3514207 A1 | 10/1986 |
| FR | 2 745 439 | 8/1997 |
| GB | 2 282 709 A | 4/1995 |
| JP | A-7-107704 | 4/1995 |
| JP | A-11-220851 | 8/1999 |
| JP | A-11-332178 | 11/1999 |
| JP | 2003-143801 | * 5/2003 |

* cited by examiner

*Primary Examiner*—Karl Tamai
(74) *Attorney, Agent, or Firm*—Oliff & Berridge PLC

(57) ABSTRACT

A stator having an armature winding and a rotor having a field winding are contained in an alternator housing. A cooling fan is connected to at least one axial end of the rotor, and a plurality of windows are formed in an axial end wall of the housing to face the cooling fan. A shroud surface facing the cooling fan is formed at a radial outside of each window. The opening of the window is so made that it gradually decreases along a rotational direction of the cooling fan, while the shroud surface area gradually increases along the same direction. In this manner, pressure changes in a space between the fan blades and the fan shroud are smoothened, and thereby noises generated by the cooling fan are effectively reduced.

5 Claims, 5 Drawing Sheets

FRONT SIDE ← → REAR SIDE

ROTATIONAL DIRECTION

ROTATIONAL DIRECTION

ROTATIONAL DIRECTION

AUTOMOTIVE ALTERNATOR HAVING COOLING-AIR-INTAKE-WINDOW HAVING UNEVEN OPENING AREA ALONG ROTATIONAL DIRECTION

CROSS-REFERENCE TO RELATED APPLICATION

This application is based upon and claims benefit of priority of Japanese Patent Application No. 2001-340632 filed on Nov. 6, 2001, the content of which is incorporated herein by reference.

BACKGROUND OF THE INVENTION

1. Field of the Invention

The present invention relates to an alternator for use in an automotive vehicle, and more particularly to an alternator having cooling air intake windows each having an uneven opening area along a rotational direction of a cooling fan.

2. Description of Related Art

An amount of noises generated by a cooling fan of an alternator varies in accordance with a fan shape, a shape of cooling air intake windows and a form of a fan shroud. As to the fan shape, various proposals have been made to suppress the fan noises. In those proposals, the number of fan blades and the fan shape are variously changed to reduce noises generated by the cooling fan. As to the shape of the cooling air intake windows, JP-A-7-107704 proposes to form the windows in a non-circular shape and to shape the windows in various shapes different from one another in order to disperse order components of fan noises and thereby to suppress the noises as a whole.

As to the form of the fan shroud, French Patent Publication No. 2745439 proposes to make spokes of a housing in a slanted relation relative to a radial direction. A shroud surface facing fan blades is formed on a rear surface of each spoke, and pressure changes occurring when the fan blades pass each shroud surface are smoothened by slanting the spokes. In this manner, the fan noises are suppressed.

The proposal made by the above-mentioned JP-A-7-107704, however, changes only the shape of the cooling air intake windows and does not consider a pressure deviation in a space between fan blades and a fan shroud. Although the above-mentioned French Patent Publication proposes to form the spokes in a slanted relation relative to the radial direction, it is not desirable to form the spokes in such a form because the slanted spoke becomes longer than a radially extending spoke, and thereby mechanical strength of the spoke is sacrificed. Further, it is not desirable to form the slanted spokes in a die-casting process because a molten metal flow is not smooth compared with the radially extending spokes.

SUMMARY OF THE INVENTION

The present invention has been made in view of the above-mentioned problem, and an object of the present invention is to provide an improved alternator in which noises generated by a cooling fan are effectively suppressed. More particularly, pressure changes in a space between a fan shroud and fan blades are smoothened.

An alternator for use in an automotive vehicle includes a housing, a stator having an armature winding, and a rotor having a field winding. The stator is fixedly contained in the housing, and the rotor is disposed inside the stator and rotatably supported in the housing. A cooling fan having plural fan blades is connected at least one axial end of the rotor, and plural cooling air intake windows are formed at an axial end of the housing so that windows face the cooling fan. The armature winding and other components of the alternator are cooled by cooling air sucked by the cooling fan rotated together with the rotor.

Each of the cooling air intake windows is formed in a space between neighboring two spokes of the housing. A shroud surface facing the fan blades is formed at a radial outside of each window. An opening area of the window is made uneven so that it gradually decreases along a rotational direction of the cooling fan, while the shroud surface gradually increases along the rotational direction. An outer fringe of the window is defined by an inner fringe of the shroud surface.

The shroud surface area facing the fan blades per a unit rotational angle of the cooling fan gradually increases according to rotation of the cooling fan. In other words, a distance between a rotational axis of the cooling fan and the inner fringe of the fan shroud gradually decreases along the rotational direction. Pressure in a space between the fan blades and the fan shroud smoothly changes as the cooling fan rotates, because the area of the fan shroud facing the fan blades gradually changes according to rotation of the cooling fan. In this manner, noises generated by the cooling fan are suppressed.

The surface of each fan blade is made in parallel to the rotational axis of the cooling fan and slanted from a radial direction extending from the rotational axis. The inner fringe of the shroud surface is so made that an angle between the blade surface and the inner fringe (referred to as a blade angle) is relatively large when a fan blade begins to engage with each window and becomes gradually smaller according to rotation of the cooling fan. In this manner, noises generated by the cooling fan are effectively suppressed.

Preferably, the inner fringe is formed so that the blade angle changes in each window fall in a range of about 30-degree. For example, the blade angle at the beginning of blade engagement with the window may be made 57-degree, and 25-degree at the end of the engagement. Since the blade surface is slanted from the radial direction, cooling air sucked by the cooling fan is blown not only in the radial direction but also in the axial direction. In this manner, the fan noises can be further reduced. The spokes positioned between the windows are made to extend straight in the radial direction in order to secure their mechanical strength and to make molten metal flow smooth in a die-casting process for making the housing.

Other objects and features of the present invention will become more readily apparent from a better understanding of the preferred embodiment described below with reference to the following drawings.

DETAILED DESCRIPTION OF THE PREFERRED EMBODIMENT

Figure 1:
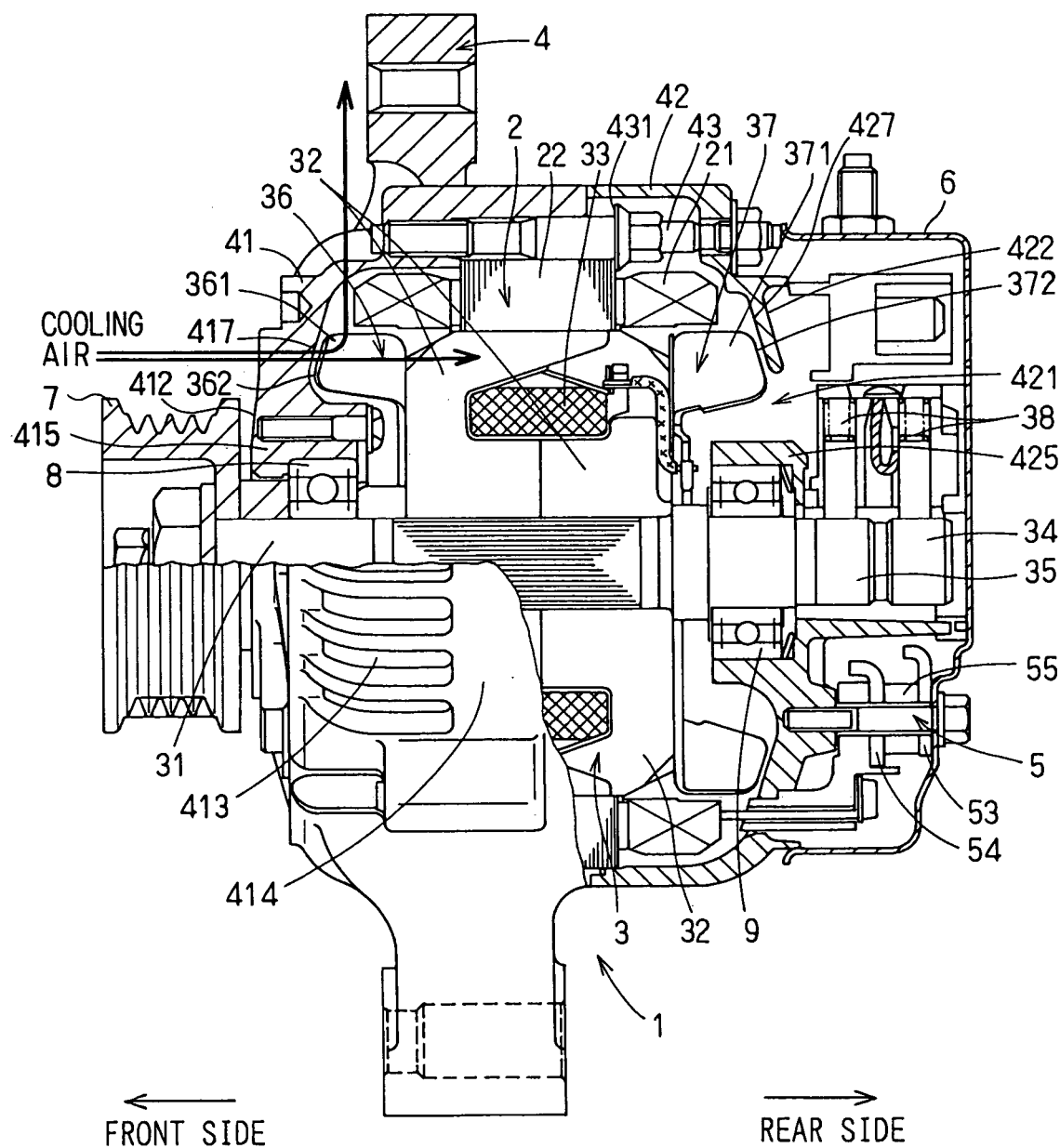
FIG. 1 is a cross-sectional view showing an alternator according to the present invention.

A preferred embodiment of the present invention will be described with reference to accompanying drawings. First, referring to FIG. 1, an entire structure of an alternator 1 of the present invention will be described. The alternator 1 includes a stator 2, a rotor 3, a housing 4, a rectifier 5, rear cover 6, and a pulley 7. The stator 2 is composed of a cylindrical stator core 22 having plural slots and an armature winding 21 disposed in the plural slots. The rotor 3 disposed inside the stator 2 is composed of a shaft 31, rotor core 32, a field winding 33, slip rings 34, 35, a cooling fan 36, 37 and other associated components. The rotor core 32 is composed of a pair of cores each having a same number of craws, and the field winding 33 wound on the rotor core 32 is sandwiched between the pair of cores.

Figure 3:
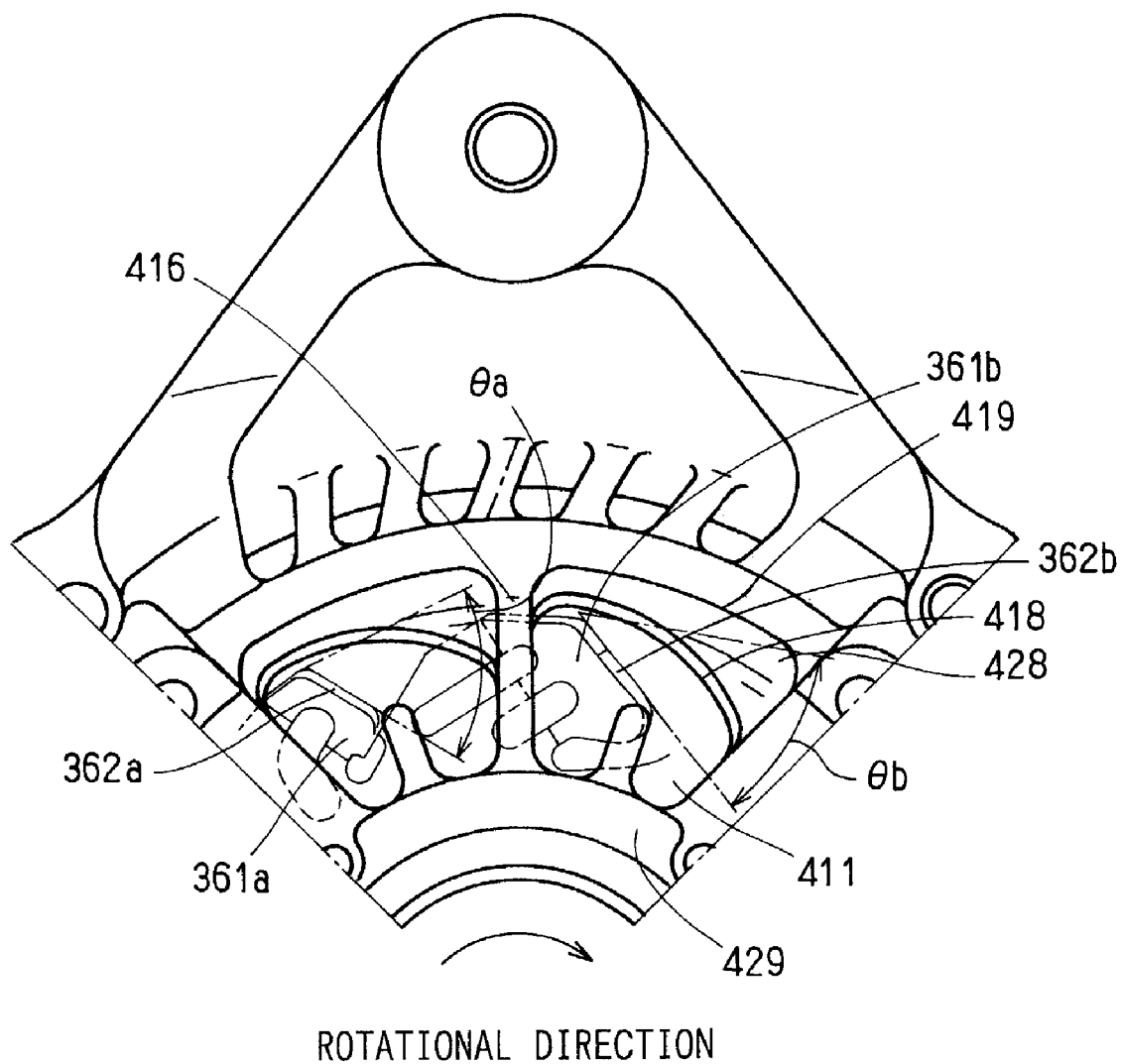
FIG. 3 is a plan view showing part A encircled in FIG. 2 in an enlarged scale, in which a fan blade is rotated to a position where it begins to cross a cooling air intake window.
Figure 4:
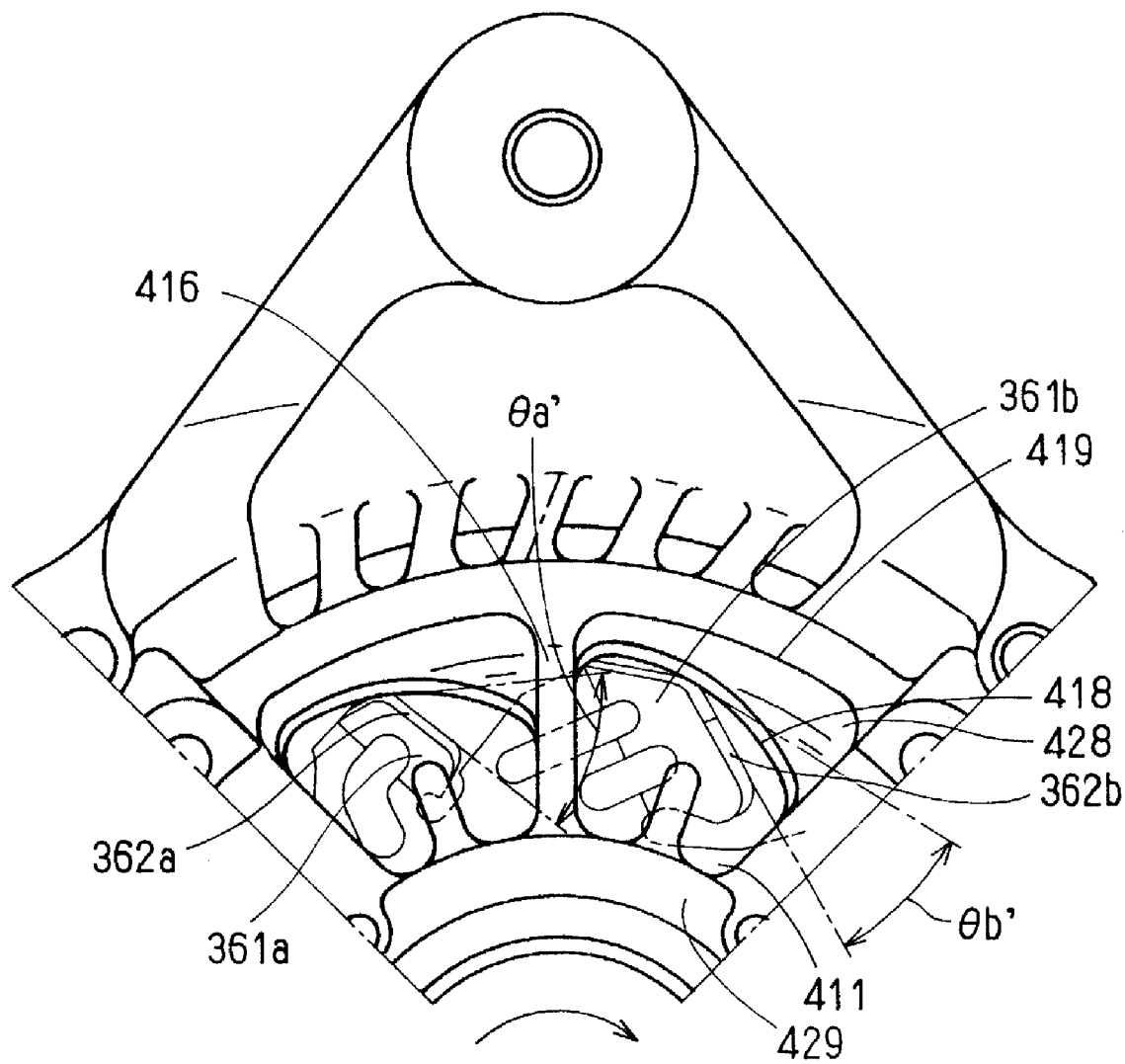
FIG. 4 is a plan view showing the same part as in FIG. 3, in which the fan blade is rotated to an approximately middle portion of the cooling air intake window.
Figure 5:
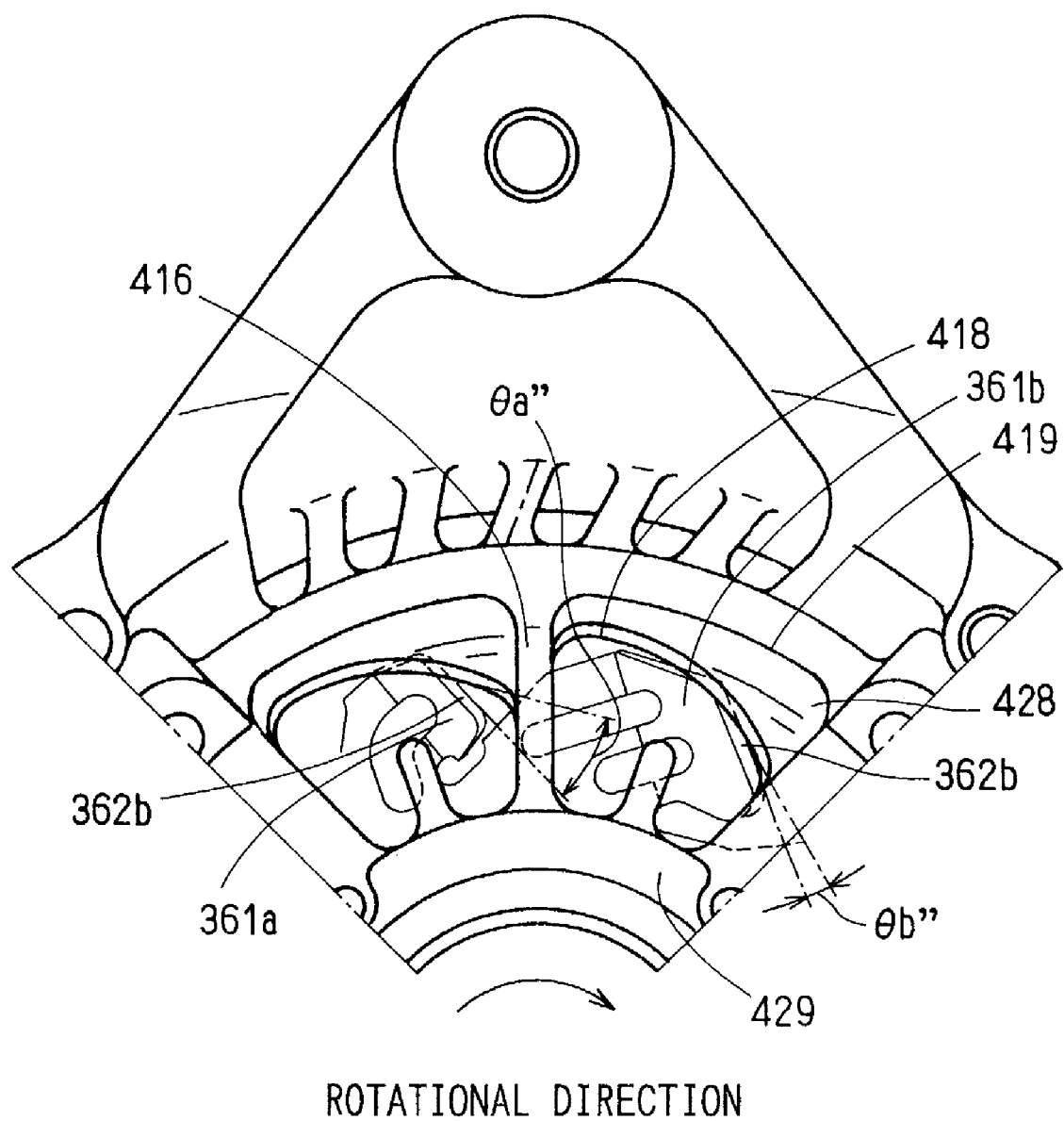
FIG. 5 is a plan view showing the same part as in FIG. 3, in which the fan blade is rotated to an end portion of the cooling air intake window.

A cooling fan 36 having fan blades 361 is connected to a front surface of the rotor core 32 (a front side and a rear side of the alternator 1 are shown in FIG. 1) by spot welding or the like. The fan blades 361 stand upright from the front surface, and a surface of each blade is slanted relative to a radial direction extending from a rotational axis of the rotor 3 (the slanted direction is shown in FIGS. 3, 4 and 5). The cooling fan 36 sucks cooling air from the front side of the housing 4 and blows out the sucked air both in the radial direction and in the axial direction. Similarly, another cooling fan 37 having fan blades 371 is connected to a rear surface of the rotor core 32. The cooling fan 37 connected to the rear surface is a centrifugal fan that sucks cooling air from the rear side and blows out the sucked air in the radial direction.

At the rear end of the shaft 31, a pair of slip rings 34, 35 for supplying electric current to the field winding 33 is provided. Brushes 38 slidably contact the pair of slip rings 34, 35 to feed electric current to the field winding 33.

The housing 4 that contains the stator 2, the rotor 3 and other components therein is composed of a cup-shaped front housing 41 and a cup-shaped rear housing 42. The front housing 41 and the rear housing 42 are connected to each other by bolts 43. One axial end of the stator core 22 abuts an inner flange of the front housing 41, and the other axial end of the stator core 22 abuts a flange portion 431 of the bolt 43, and thereby the stator core 22 is fixedly sandwiched between the front housing 41 and the rear housing 42.

A bearing box 415 containing a front bearing 8 is formed at a center portion of an axial end wall 412 of the front housing 41. A bearing box 425 containing a rear bearing 9 therein is formed at a center portion of an axial end wall 422 of the rear housing 42. The shaft 31 of the rotor 3 is rotatably supported by the front bearing 8 and the rear bearing 9. The front side bearing box 415 is connected to an outer wall 414 by radially extending spokes 416 (shown in FIG. 2). The rear side bearing box 425 is similarly supported by spokes formed on the rear housing 42.

Figure 2:
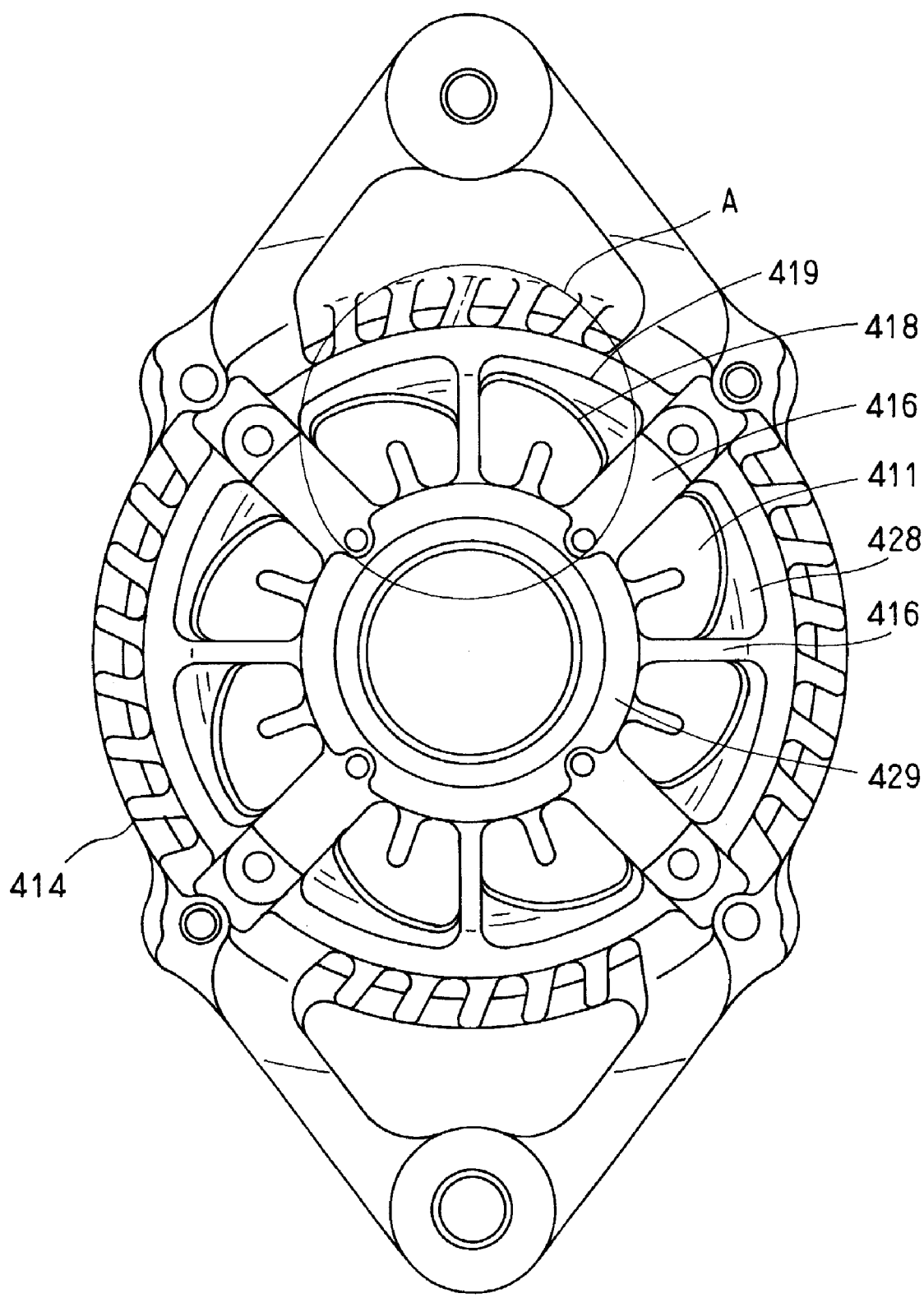
FIG. 2 is a plan view showing a front side of a front housing of the alternator.

Cooling air intake windows 411 are formed on the axial end wall 412 of the front housing 41 and between neighboring two spokes 416 as shown in FIG. 2. Cooling air intake windows 421 at the rear side are similarly formed on the axial end wall 422 of the rear housing 42. Cooling air outlet ports 413 are formed on the outer wall 414 of the front housing 41. Outlet ports at the rear side (not shown) are similarly formed on an outer wall of the rear housing 42. Cooling air sucked by the cooling fans 36, 37 through the cooling air intake windows 411, 421 is blown out through the cooling air outlet ports.

The rectifier 5 is disposed outside the rear housing 42 and covered by a rear cover 6 made of an aluminum plate. Plural air inlet holes are formed on the rear cover 6. The rectifier 5 includes positive side rectifier elements connected to a heat dissipating fin 54, and negative side rectifier elements connected to a heat dissipating fin 53. Terminals for connecting the armature winding 21 and the rectifier 5 are disposed on a terminal plate 55. A pulley 7 is connected to the front end of the shaft 31, and the rotor 3 is rotated by the pulley 7 which is driven by an automotive engine (not shown) through a driving belt.

Now, referring to FIGS. 2–5, the cooling air intake window 411, a shroud wall 428 forming a shroud surface 417 on its rear surface, and a relation between the fan blades 361 and the window 411, will be described in detail. As shown in FIG. 2, a plurality of cooling air intake windows 411 are formed on the axial end wall 412 of the front housing 41. Each window 411 is formed at a radial outside of a circular wall 429 and between neighboring two spokes 416. A shroud wall 428, a rear surface of which constitutes a shroud surface 417 is formed at a radial outside of each window 411. The shroud wall 428 is defined by an inner fringe 418 and an outer periphery 419 which is coaxial to the circular wall 429. The shroud surface 417 faces an axial end 362 of the fan blade 361 with a small space therebetween. The shroud surface 417 also includes a rear surface of the spokes 416. Although the cooling air intake windows 421 at the rear side are not shown in the drawings in detail, an axial end 372 of the fan blade 371 faces a shroud surface 427 of the rear housing 42 as shown in FIG. 1.

The cooling fan 36 connected to the rotor 3 rotates together with the rotor 3 in a clockwise direction, viewed from the front side. The shroud wall 428 defined by the inner fringe 418 and the outer periphery 419 is gradually enlarged along the rotational direction, as shown in FIG. 2. In other words, the opening area of the window 411 is gradually decreased along the rotational direction. This also means that an area of the shroud wall 428 per unit rotational angle is gradually increased along the rotational direction. It can be also said that a distance from a rotational axis of the rotor 3 to the inner fringe 418 gradually decreases along the rotational direction.

A portion of the front housing 41 that includes the cooling air intake window 411 (encircled with "A" in FIG. 2) is shown in FIGS. 3, 4 and 5 in an enlarged scale. In those drawings, two types of fan blades are shown for explanation purposes, so that a fan blade-A 361a is seen through one window 411 and a fan blade-B 361b through another window 411. In an actual alternator, however, only one type of fan blade is used. FIG. 3 shows a situation where the fan blade begins to engage with the inner fringe 418 of the shroud wall 428. FIG. 4 shows a situation where the fan blade comes to a center portion of the window 411. FIG. 5 shows a situation where the fan blade engagement with the window 411 is about to finish.

As to the fan blade-A 361a, a blade angle relative to the inner fringe 418, which is defined as an angle made between a tangent line to the inner fringe 418, at a crossing point of the inner fringe 418 and the axial end 362a of the fan blade 361a, and an axial end 362a of the blade, is denoted as θa in FIG. 3, θa' in FIG. 4 and θa" in FIG. 5. The blade angle θa is about 57°, θa' is about 45°, and θa" is about 25°. This means that the cooling air intake window 411 and the fan blade-A 361a are so made that the blade angle gradually decreases according to rotation of the cooling fan 36 in the clockwise direction. As to the fan blade-B 361b, its blade angle is similarly defined. The blade angle θb shown in FIG. 3 is about 41°, θb' shown in FIG. 4 is about 29°, and θb" shown in FIG. 5 is about 9°. This means that, in the case of the fan blade-B, too, the blade angle gradually decreases according to the rotation of the cooling fan.

As described above, in the case of the fan blade-A 361a, the blade angle changes from 57° to 25°, i.e., in a range of about 30°. In the case of the fan blade-B 361b, the blade angle changes from 41° to 9°, i.e., in a range of about 30°. That is, the shape of the cooling air intake window 411, i.e., the shape of the inner fringe 418 is formed so that the blade angle changes in a range of about 30° regardless of types of the fan blades. It has been proved through experiments that fan noises are effectively suppressed by setting the blade angle change in the range of about 30°. The shape of the shroud wall 428, the rear surface of which constitutes the shroud surface 417, is determined to satisfy the blade angle changes in the range of about 30°.

The alternator 1 described above is driven by an automotive engine (not shown). As the rotor 3 rotates, alternating current is generated in the armature winding 21 of the stator 2. The alternating current is rectified by the rectifier 5 into direct current, and the direct current is supplied to an on-board battery (not shown). The cooling fans 36, 37 are rotated together with the rotor 3 thereby to cool the armature winding 21, the rectifier 5 and other components of the alternator 1.

Since a distance from the rotational axis of the rotor 3 to the inner fringe 418 of the shroud wall 428 gradually decreases along the rotational direction, the area of the shroud surface 417 facing the axial end 362 of the fan blade 361 gradually increases according to the clockwise rotation of the cooling fan 36. Therefore, rapid changes in the pressure between the fan blade 361 and the shroud surface 417 are avoided, and thereby fan noises generated between the fan blade 361 and the shroud surface 417 are suppressed.

Since an area of the shroud surface 417 per a unit rotational angle of the cooling fan 36 gradually increases in accordance with the clockwise rotation of the cooling fan 36, pressure changes in the space between the fan blade 361 and the shroud surface 417 are smoothened. Accordingly, the fan noises due to the pressure changes are alleviated.

Since the shroud surface area facing the axial end 362 of the fan blade 361 gradually increases according to the rotation of the cooling fan 36 by making the blade angle (θa or θb) gradually decrease along the rotational direction, the pressure changes in the space between the axial end 362 and the shroud surface 417 are smoothened. The fan noises are effectively suppressed by making the blade angle decrease in a range of about 30°.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An automotive alternator, comprising:
   a housing;
   a stator housed in the housing, the stator including a stator core and an armature winding wound on the stator core;
   a rotor rotatably supported in the housing and disposed inside the stator, the rotor including a rotor core and a field winding wound around the rotor core; and
   a cooling fan fixed to at least one axial end of the rotor core so as to rotate coaxially with the rotor, the cooling fan including a plurality of fan blades, wherein:
   the housing includes a plurality of cooling air intake windows formed in an axial end wall of the housing so that the windows face the cooling fan, each window being formed in a space between neighboring two spokes connecting an inner circular wall of the housing and an outer wall of the housing, the spokes connecting the inner circular wall of the housing to the outer wall of the housing extend straight in a radial direction, and a plurality of shroud surfaces, each formed at a radial outside of each window to have a substantially same total area common to all shroud surfaces, so that the shroud surfaces face an axial end of the fan blades;
   an area of each shroud surface facing the axial end of the fan blades gradually increases along a rotational direction of the cooling fan; and
   each shroud surface has an inner fringe defining a radial outer fringe of the window, the inner fringe curving continuously with an arcuate curvature along the rotational direction of the cooling fan, the arcuate curvature of the inner fringe of each shroud having a respective curvature center different from one another.

2. An automotive alternator, comprising:
   a housing;
   a stator housed in the housing, the stator including a stator core and an armature winding wound on the stator core;
   a rotor rotatably supported in the housing and disposed inside the stator, the rotor including a rotor core and a field winding wound around the rotor core; and
   a cooling fan fixed to at least one axial end of the rotor core so as to rotate coaxially with the rotor, the cooling fan including a plurality of fan blades, wherein:
   the housing includes a plurality of cooling air intake windows formed in an axial end wall of the housing so that the windows face the cooling fan, each window being formed in a space between neighboring two spokes connecting an inner circular wall of the housing to an outer wall of the housing, the spokes connecting the inner circular wall of the housing to the outer wall of the housing extend straight in a radial direction, and a plurality of shroud surfaces, each formed at a radial outside of each window to have a substantially same total area common to all shroud surfaces, so that shroud surfaces face an axial end of the fan blades; and
   a distance from a rotational axis of the cooling fan to an inner fringe of each shroud surface, which also defines a radial outer fringe of the window and curves with an arcuate curvature, gradually and continuously decreases along a rotational direction of the cooling fan, a curvature center of the arcuate curvature of each inner fringe being respectively different from one another.

3. An automotive alternator, comprising:
   a housing;
   a stator housed in the housing, the stator including a stator core and an armature winding wound on the stator core;
   a rotor rotatably supported in the housing and disposed inside the stator, the rotor including a rotor core and a field winding wound around the rotor core; and
   a cooling fan fixed to at least one axial end of the rotor core so as to rotate coaxially with the rotor, the cooling fan including a plurality of fan blades, wherein:
   the housing includes a plurality of cooling air intake windows formed in an axial end wall of the housing so that the windows face the cooling fan, each window being formed in a space between neighboring two spokes connecting an inner circular wall of the housing to an outer wall of the housing, the spokes connecting the inner circular wall of the housing to the outer wall of the housing extend straight in a radial direction, and a plurality of shroud surfaces, each formed at a radial outside of each window to have a substantially same total area common to all shroud surfaces, so that shroud surfaces face an axial end of the fan blades; and a blade angle made between the axial end of the fan blade and an inner fringe of each shroud surface, which also defines a radial outer fringe of the window, gradually decreases according to rotation of the cooling fan, the inner fringe of each shroud surface being continuously curved with an arcuate curvature a center of which differs from shroud surface to shroud surface.

4. The automotive alternator as in claim 3, wherein:

the blade angle is the largest when the fan blade begins to engage with each window and becomes the smallest when the fan blade is about to disengage from the window, and a difference between the largest and the smallest blade angles is about 30-degree.

5. The automotive alternator as in any one of claims 1–3, wherein the cooling fan is a fan that blows air in each of a radial direction and an axial direction.

* * * * *